April 1, 1958     J. F. LASH     2,828,911
UNBALANCE DATA CORRECTION APPARATUS
Filed Sept. 27, 1954     2 Sheets-Sheet 1
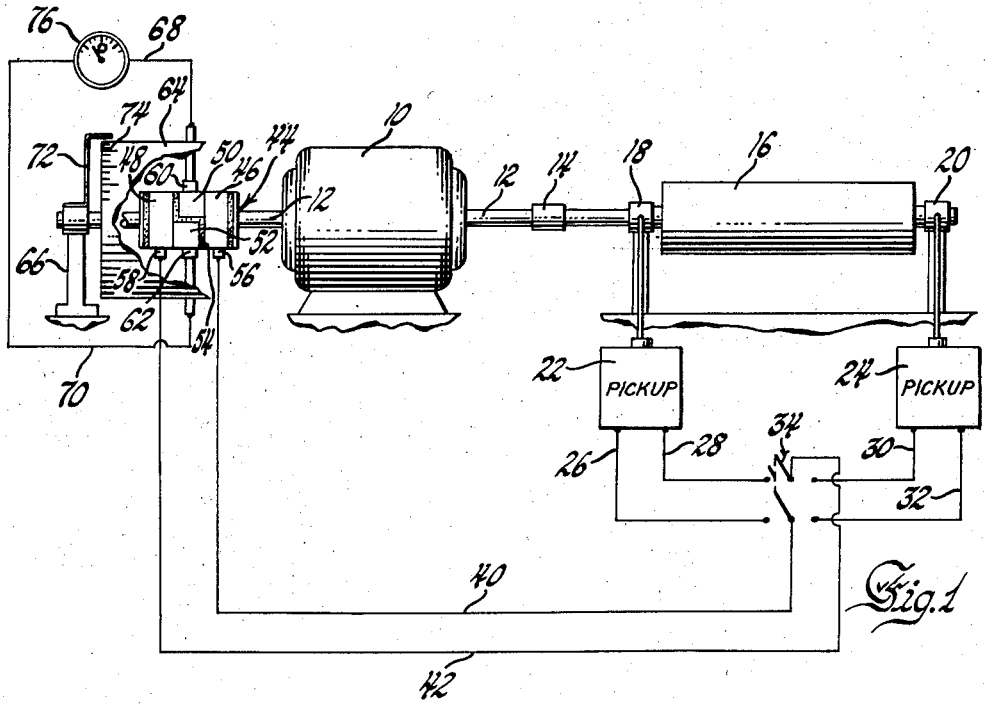
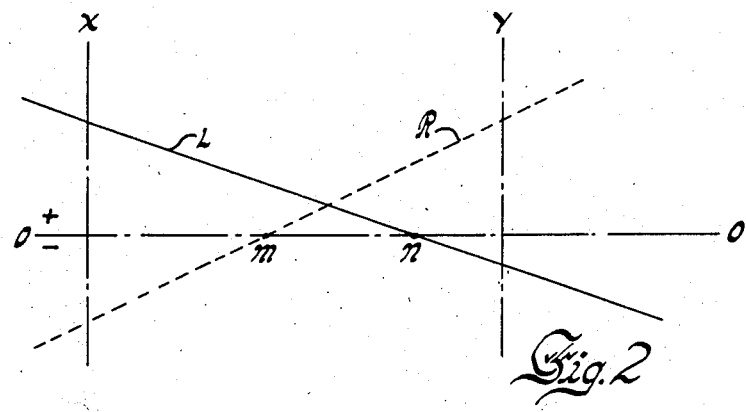
INVENTOR
Joseph F. Lash
BY L. D. Burch
ATTORNEY April 1, 1958         J. F. LASH         2,828,911
UNBALANCE DATA CORRECTION APPARATUS
Filed Sept. 27, 1954         2 Sheets-Sheet 2
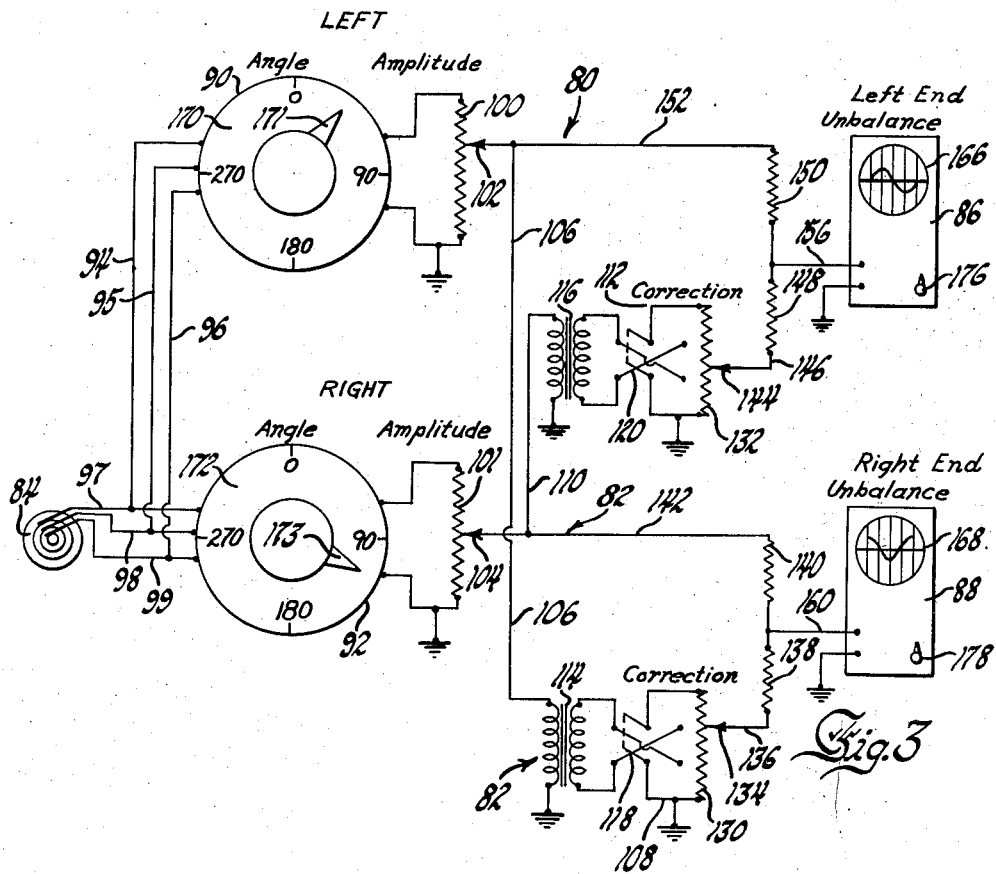
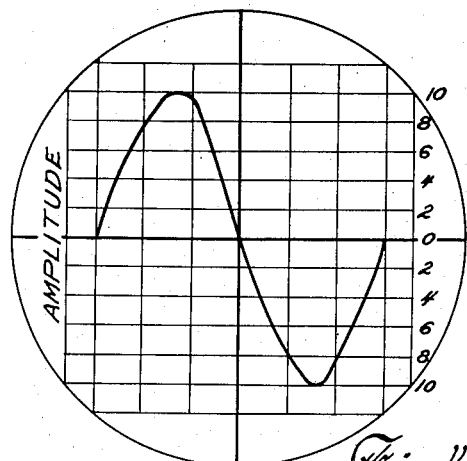
INVENTOR
Joseph F. Lash
BY
L. D. Burch
ATTORNEY

United States Patent Office 2,828,911
Patented Apr. 1, 1958

2,828,911

UNBALANCE DATA CORRECTION APPARATUS

Joseph F. Lash, Ferndale, Mich., assignor to General Motors Corporation, Detroit, Mich., a corporation of Delaware Application September 27, 1954, Serial No. 458,309

2 Claims. (Cl. 235—61)

This invention relates to balancing machines for rotating bodies and, more particularly, to apparatus for correcting measurements of the unbalance effects taken near one end of a rotating body for the influence on such measurements of the unbalance effects associated with the opposite end of the body.

The invention has among its objects to provide unbalance data correction apparatus of the above character which operates on the actual measured values of raw or uncorrected unbalance measurements derived from a simple balancing machine. Another object is to provide apparatus in accordance with the above which furnishes corrected unbalance information in graphical wave form to which reference may be made by an operator while making the balance corrections on the workpiece. A further object is to provide such apparatus which furnishes corrected unbalance information that may be maintained in permanent displayed form independently of the operation of the balancing machine.

The above and other objects of the present invention will appear more fully from the following detailed description and drawings wherein:

Fig. 1 is a diagrammatic illustration of a simple balancing machine with which the correction apparatus of the present invention may be employed;

Fig. 2 is a simple representation of the distribution of unbalance influences in a dynamically unbalanced body;

Fig. 3 is an electrical schematic diagram of an unbalance data correction apparatus in accordance with the present invention; and Fig. 4 is a graphical representation of the form of corrected unbalance information displayed with the correction apparatus of Fig. 3.

Referring to the drawings, the unbalance detecting installation illustrated in Fig. 1 with which the correction apparatus of the present invention may be employed comprises a drive motor 10 the rotor shaft 12 of which is connected through a suitable coupling arrangement 14 to an elongated rotatable body-to-be-balanced 16 which is journaled in suitable vibratile supports 18, 20 that permit vibration of both ends of the body. Contacting the journals 18, 20 and mounted at right angles to the plane thereof are a pair of electromagnetic vibration pickup devices 22, 24 which generate an alternating current electrical signal having a frequency corresponding to the rotational speed of the drive motor 10 and having phase and amplitude characteristics related to the location and magnitude of the unbalance in the body. The electrical outputs of the pickup devices 22, 24 are applied over conductors 26, 28 and 30, 32 respectively, to the end terminals of a D. P. D. T. selector switch 34 the switch arms of which are connected over conductors 40, 42 to a commutator or equivalent interrupter device 44 driven synchronously with the body 16 from the shaft of the drive motor.

The commutator device 44 comprises an arrangement of continuous end rings 46, 48 and split intermediate rings 50, 52, the latter being separated by insulation 54 as shown, and an arrangement of stationary brushes 56, 58, which are associatde with the end rings 46, 48, and movable brushes 60, 62, which are associated with the split intermediate rings 50, 52, respectively. The movable brushes 60 and 62 are mounted in suitable brush holders which are carried on a mounting ring 64 rotatably supported in a fixed, non-vibratile journal support 66 whereby the angular position of these two brushes may be simultaneously adjusted in relation to a reference axial plane of the rotating body. The non-oscillatable support 66 is shown with an upstanding stationary index 72 that is rigidly mounted thereon and is adapted to cooperate with graduated angular indicia 74 on the adjacent peripheral edge of the adjustable ring 64 whereby an indication of the angular displacement of the ring relative to the pointer may be ascertained. Conductors 40, 42 from the pickup selector switch 34 are connected to the end brushes 56, 58 while the movable brushes 60, 62 are connected over conductors 68, 70 to a zero center unidirectional current indicating instrument 76 on which a quantity related to the magnitude of unbalance detected by the pickup that is connected to the commutator or rectifier device is read.

With the selector switch 34 in either the right or left hand position, the left or right end pickup 22 or 24 is connected with the commutator and indicating arrangement by which the phase and magnitude of the unbalance effects associated with the left end or the right end of the rotating body are measured by manually rotating the movable brush mounting ring 64 until the indication on the meter 76 is, say, a positive maximum. The angular displacement of the ring 64 relative to the stationary index 72 will then be an angular measure of the location of the axial plane of the unbalance detected by the connected pickup, while the absolute magnitude of the maximum reading on the instrument 76 will be related to the magnitude of the unbalance.

The magnitude of the readings obtained with the simple unbalance detecting apparatus of Fig. 1 will not be a true indication of the unbalance in one end of the body but will contain or be related to the combined influence of the unbalance in both ends thereof, as may be ascertained from Fig. 2 in which the center line O—O represents the geometrical axis of the body 16, the inclined solid line L, the effect along the geometrical axis of an unbalance in the left end thereof, and the oppositely inclined broken line R, the effect along the geometrical axis of unbalance in the right end of the body. The axially spaced vertical dashed lines X and Y represent a pair of selected transaxial planes of correction of the body 16, and it will be noted from Fig. 2 that the total unbalance in each of these planes is composed of unbalance influences from both the right and the left ends of the body 16.

In order to correct for the unbalance associated with each end of the rotor in any selected transaxial plane thereof, it, therefore, is necessary to know the actual magnitude of the unbalance at the right end or the left end thereof without the modifying influence of the opposite end unbalance. The present invention enables such determinations to be made from the measured data obtained from a simple unbalance detecting apparatus and employs the unbalance data correction system illustrated in Fig. 3 for accomplishment of this end.

The unbalance data correcting apparatus of Fig. 3 comprises a pair of main circuit branches 80 and 82 which are energized from a three phase source of supply 84 and which include phase, amplitude and cross-connected correction controls which are set or adjusted manually by the operator in accordance with the raw uncorrected unbalance data associated with the left end and right end, respectively, of the unbalanced body as obtained from the indicating apparatus of Fig. 1. The corrected unbalance magnitude measurements obtained with the correction apparatus of Fig. 3 are displayed on suitable indicating devices such as the cathode ray oscilloscopes 86 and 88, which are provided with ruled screens, as shown in Fig. 4, and with customary gain controls.

Each branch circuit of the above correcting apparatus comprises a pair of conventional selsyn or equivalent generator devices 90, 92 the star-connected stator windings of which are connected respectively over conductors 94, 95, 96 and 97, 98, 99 for energization from the three phase alternating current supply 84, which may be of low voltage, 6 volts, and any convenient frequency, such as 60 cycles, for example. The rotor terminals of the selsyn generators are connected across suitable potentiometer devices 100, 101 each of which has an adjustable arm as 102 or 104 associated therewith and a grounded end or low potential terminal, as shown. Potentiometer arm 102 of left potentiometer 100 is connected over branch conductor 106 to a correction network 108 for the right main circuit 82, while potentiometer arm 104 of the right potentiometer 101 is connected over branch conductor 110 to a correction network 112 for the left main circuit 80.

Each correction network includes a one to one ratio transformer as 114 or 116 one side of the primary winding of each of which is connected to conductor 106 or 110 and the other side of which is grounded. The secondary winding of each transformer is connected to a D. P. D. T. phase reversing switch 118 or 120 the switch arms of which are connected across the end terminals of correction potentiometers as 130 or 132, respectively. One of the end terminals of each correction potentiometer is grounded, as shown. Arm 134 of correction potentiometer 130 is connected in a series circuit extending from ground through the portion of correction potentiometer 130 between ground and arm 134, conductor 136, voltage dividing resistors 138 and 140, conductor 142 connected to arm 104 of left main potentiometer 101, and through that potentiometer to ground. Arm 144 of correction potentiometer 132 similarly is connected in a series circuit extending from ground through correction potentiometer 132, arm 144, conductor 146, voltage dividing resistors 148 and 150, conductor 152 connected to arm 101 of right main potentiometer 100 and through that potentiometer to ground.

Each correction network functions to inject a correcting voltage into the opposite main branch circuit. The correction voltage appearing between the adjustable arm and the grounded terminal of a respective one of the correction potentiometers is added or subtracted, depending upon the position of the phase reversing switches 118 and 120, to the output of the opposite main potentiometer 100 or 101 appearing between the adjustable arm and the grounded terminal of either one of the latter potentiometers, the addition or subtraction being performed in the series circuits traced immediately above.

A signal voltage representative of the resulting or corrected voltage of the left main branch circuit is applied over conductor 156, which is connected to the junction of the voltage dividing resistors 148 and 150, to one of the vertical input terminals of the left cathode ray oscilloscope 86, the other input terminal of which is grounded. A voltage representative of the resulting or corrected voltage of the right main branch circuit similarly is applied over conductor 160, which is connected to the junction of resistors 138 and 140, to one of the input terminals of the right cathode ray oscilloscope 88, the other input terminal of which is grounded. The screens 166, 168 of the oscilloscopes may be ruled as shown in Fig. 4 to facilitate reading of the corrected unbalance information which is graphically displayed in the form of sine waves thereon, the selsyn generators being energized from a sinusoidal alternating current supply.

Suitable ohmic values for the main potentiometers, correcting potentiometers and each of the voltage dividing resistors in the series combining or mixing circuits may be 200 ohms, 10,000 ohms and 100,000 ohms, respectively. Selection of such increasing resistance values in progressing through the correction circuit will avoid loading of the preceding or anterior circuit elements and will assure a high degree of accuracy of the system. The input impedance of the oscilloscopes is in the order of two megohms and thus also will prevent loading of the preceding circuit elements.

The calibration and operation of the correction apparatus is as follows:

The readings obtained from the unbalance detecting machine of Fig. 1 are uncorrected for opposite end influence, and it will be assumed that the amplitude readings will be in terms of unbalance units rather than ounce-inches or other units of unbalance. The amplitude readings in unbalance units obtained from the meter 76 of the unbalance detecting machine for each position of the selector switch 34 are manually set on the left and right amplitude potentiometers 100, 101 of the correcting apparatus. The unbalance angle readings from the machine are introduced into the apparatus by angularly displacing the rotors of the two selsyn generators 90, 92 an amount corresponding to the left and right unbalance location or angle readings. A suitable dial and pointer arrangement 170, 171 and 172, 173 associated with the stator and rotor of each selsyn generator is provided for this purpose. Since the stator windings of the selsyn generators are connected to a three phase alternating current supply, a single phase output will be derived from the rotor windings thereof. The rotor output voltage will be of constant amplitude but of variable phase as the rotor is angularly displaced.

The correction apparatus is calibrated with a known unbalance, say 10 ounce-inches, placed on, say, the left end of a balanced workpiece at a convenient angle, such as 0 degree, for example. This unbalance weight will produce a large unbalance reading at the left end of the unbalance detecting machine of Fig. 1 and will produce a small unbalance at the right end. The angle reading for the left end will be 0 degree, whereas the angle reading for right end will be either 0 degrees or 180 degrees depending on the shape of the workpiece, the location of the unbalance detectors and other factors. With a system corresponding to the graphical representation of Fig. 2, the phase of the unbalance influence at one end of the body 16 due to unbalance in the opposite end thereof is 180 degrees relative to the angle of the unbalance at the opposite end. This right hand angle reading, 0 degree or 180 degrees, obtained from the commutator apparatus of Fig. 1, is then set on the right hand selsyn generator 92 of the correction network.

The amplitude reading of the left end unbalance is set in absolute unbalance units on the left branch correction potentiometer 100 which is done by assigning a value of 10 units to a setting of the potentiometer arm 102 thereof when the latter is at or near the upper end of the potentiometer and depending upon the range of unbalance magnitude measurement with which the correction apparatus is to be employed. In addition to setting the right end angle reading on the right end selsyn, the small right end unbalance magnitude reading is set on the right branch correction amplitude potentiometer 101.

The left and right branch oscilloscopes should indicate the corrected unbalance reading; that is, 10 units for the left end and 0 for the right. The gain control 176 of the left oscilloscope is adjusted to produce a sine wave with an amplitude of 10 ounce-inches according to the markings on the oscilloscope screen 166, as shown in Fig. 4.

The reading on the right hand oscilloscope 88 is brought to zero (a straight line on the screen) by adjusting the correction potentiometer 130 of the right branch correction circuit 108. While adjusting this potentiometer the adjacent reversing switch 118 will be displaced either to the left or right depending on whether an in phase or an out of phase correction is required.

The right hand controls of the correction device are calibrated in the same manner by placing the known unbalance weight at a known location on the right end of the body 16, noting the raw unbalance magnitude readings at the right end and left end of the body and the phase of the unbalance influence at the left end of the body due to unbalance in the right end and relative to the unbalance at the right end, and then setting these angle readings on the right branch and left branch selsyn generators 90 and 92 and the raw unbalance magnitude readings on the right branch and left branch amplitude correction potentiometers 101 and 100, and then setting the gain control 178 of the right oscilloscope 88 and adjusting the left correction potentiometer 132, as outlined above.

The apparatus is now calibrated and corrected to give true unbalance readings on the respective oscilloscopes. The settings of the cross correction potentiometers 130 and 132 are not disturbed so long as the correction apparatus is employed to correct data obtained from the same unbalance detecting machine, and it is only necessary to adjust the settings of the potentiometer arms 102 and 104 of the left end and right end circuit to correspond to the magnitude of the uncorrected unbalance readings obtained from the machine of Fig. 1 and to read the corrected magnitude measurements from the amplitude of the sine wave on the screen of the corresponding oscilloscope. By displacing the rotors of the selsyn generators in the correction apparatus in accordance with the unbalance location or angle readings obtained from the apparatus of Fig. 1, the position of the traces produced on the screens of the oscilloscopes will be shifted accordingly along the abscissa so that the operator may read both the angle of unbalance and the corrected magnitude of unbalance, if desired, from the oscilloscopes on which this information may be stored, even after the body to be balanced has been removed from the balancing stand of Fig. 1.

It will be noted that in distinction to prior correction apparatus serving the purpose of the present invention, the correction apparatus herein does not operate directly on the outputs of the pickup devices of the unbalance detecting machine but upon the final measured values of uncorrected data obtained from a simple detecting apparatus. Thus, the correcting apparatus need not be operatively and physically associated with the unbalance detecting system, the uncorrected readings from which may be recorded on paper and then introduced at some later time if desired, into the correction device which may be physically removed from the detecting apparatus and may be operated entirely independently thereof.

I claim:

1. Apparatus for correcting unbalance magnitude readings of one end of a dynamically unbalanced elongated body for the influence thereon of the unbalance effects associated with the opposite end of the body as obtained from a simple balancing machine providing uncorrected readings of the magnitude of the total unbalance effects and the angular location thereof at each end of said body, said apparatus comprising, in combination, a source of alternating current, a pair of parallel main circuit branches connected thereto, a separate variable phase shifting device for each circuit branch for shifting the phase of the current supplied thereto in accordance with the reading of the angular location of unbalance at one end of said body as obtained from said balancing machine, a voltage divider for each branch circuit connected to the phase shifting device in the branch circuit thereof, each of said voltage dividers being adjustable to provide an output in accordance with the magnitude of the uncorrected unbalance readings taken at the respective ends of said body as obtained from said balancing machine, a correction network for each branch circuit including an input transformer having a primary and a secondary winding, said primary winding being connected across the output of the adjustable voltage divider of the opposite main branch circuit, and output potentiometer for each correction network, a double pole-double throw switch connecting said output potentiometer across said secondary winding, means connecting said output potentiometer in series with the output of the voltage divider of the other main branch circuit, and separate indicating means connected in circuit with the output of each main branch circuit as effected by the correction network thereof.

2. Apparatus for electrically correcting unbalance magnitude readings of one end of a dynamically unbalanced elongated body for the influence thereon of the unbalance effects associated with the other end of the body as obtained from a simple balancing machine providing uncorrected readings of the magnitude of the total unbalance effects and the angular location thereof at each end of said body, said apparatus comprising, in combination, a three phase alternating current source of substantially constant amplitude, a pair of parallel main circuit branches connected thereto, a selsyn type generator device for each circuit branch having a stator winding energized from said alternating current source and a rotor winding, the rotor of each selsyn device being angularly adjusted with respect to the stator thereof in accordance with the readings of the angular location of unbalance at the respective ends of said body as obtained from said balancing machine, a voltage divider for each branch circuit connected to the rotor winding of each selsyn generator, each of said voltage dividers being adjustable to provide an output in accordance with the magnitude of the uncorrected unbalance readings taken at respective ends of said body as obtained from said balancing machine, an adjustable correction network for each branch circuit including an input transformer having a primary and a secondary winding, said primary winding being connected across the output of the adjustable voltage divider of the opposite main branch circuit, and output potentiometer for each correction network, a double pole-double throw switch connecting said output potentiometer across said secondary winding, means connecting said output potentiometer in series with the output of the voltage divider of the other main branch circuit, and separate indicating means connected in circuit with the output of each main branch circuit as effected by the correction network thereof.

References Cited in the file of this patent

UNITED STATES PATENTS

| | | |
|---|---|---|
| 2,054,267 | Ohlson | Sept. 15, 1936 |
| 2,228,011 | Lundgren | Jan. 7, 1941 |
| 2,394,411 | Tolman | Feb. 5, 1946 |
| 2,500,013 | Svensson et al. | Mar. 7, 1950 |
| 2,608,856 | Van Degrift | Sept. 2, 1952 |